United States Patent [19]

Trubiano

[11] Patent Number: 5,324,055
[45] Date of Patent: Jun. 28, 1994

[54] END-TO-END NESTABLE OVER-THE-COUNTER DISCHARGE SHOPPING CART

[75] Inventor: Antoine Trubiano, Montreal, Canada
[73] Assignee: Cari-All Inc., Montreal East, Canada
[21] Appl. No.: 40,381
[22] Filed: Mar. 25, 1993

Related U.S. Application Data

[63] Continuation-in-part of Ser. No. 971,236, Nov. 4, 1992, abandoned.

[51] Int. Cl.$^5$ .............................................. B62B 3/02
[52] U.S. Cl. ......................... 280/33.995; 280/33.993
[58] Field of Search .................. 280/33.991, 33.995, 280/33.992, 33.993, 33.996, 33.997

[56] References Cited

U.S. PATENT DOCUMENTS

| | | | |
|---|---|---|---|
| 3,297,108 | 1/1967 | Davis | 280/33.995 |
| 3,645,555 | 2/1972 | Von Stein et al. | 280/33.99 |
| 3,787,063 | 1/1974 | Oliver | 280/33.995 |
| 3,815,932 | 6/1974 | Ruger | 280/33.99 |
| 4,116,456 | 9/1978 | Stover et al. | 280/33.995 X |
| 4,118,044 | 10/1978 | Celms | 280/33.995 |
| 4,560,180 | 12/1985 | Ulmer | 280/33.995 X |

Primary Examiner—Margaret A. Focarino
Assistant Examiner—Michael Mar
Attorney, Agent, or Firm—Longacre & White

[57] ABSTRACT

An end-to-end nestable shopping cart having a frame supported on casters with a basket having an open top end supported elevated by the frame. The basket has a bottom wall, opposed side walls tapering inwardly from a rear end to a front end, a front wall, and a rear gate hinged along a top edge thereof and having leg holes therein. A handlebar is disposed rearwardly of the rear gate to displace the shopping cart on the casters. A babyseat compartment is defined in the basket between the rear gate and a hinged backrest disposed in the basket and spaced from the rear gate. The backrest has a hinged connection at the basket bottom wall for hinged displacement of the backrest forwardly over the bottom wall. Arresting means is provided to maintain the backrest upright above the bottom wall. The rear gate has engagement means to displace the backrest when in the upright position to a forward collapsed position over the bottom wall when another cart is nested through the rear gate.

7 Claims, 10 Drawing Sheets

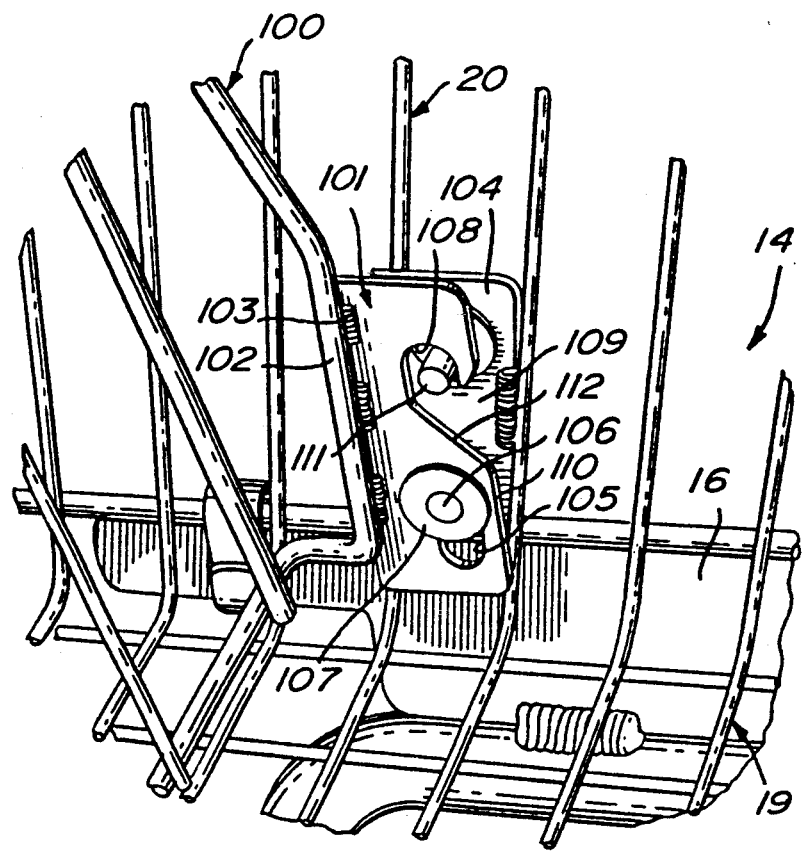
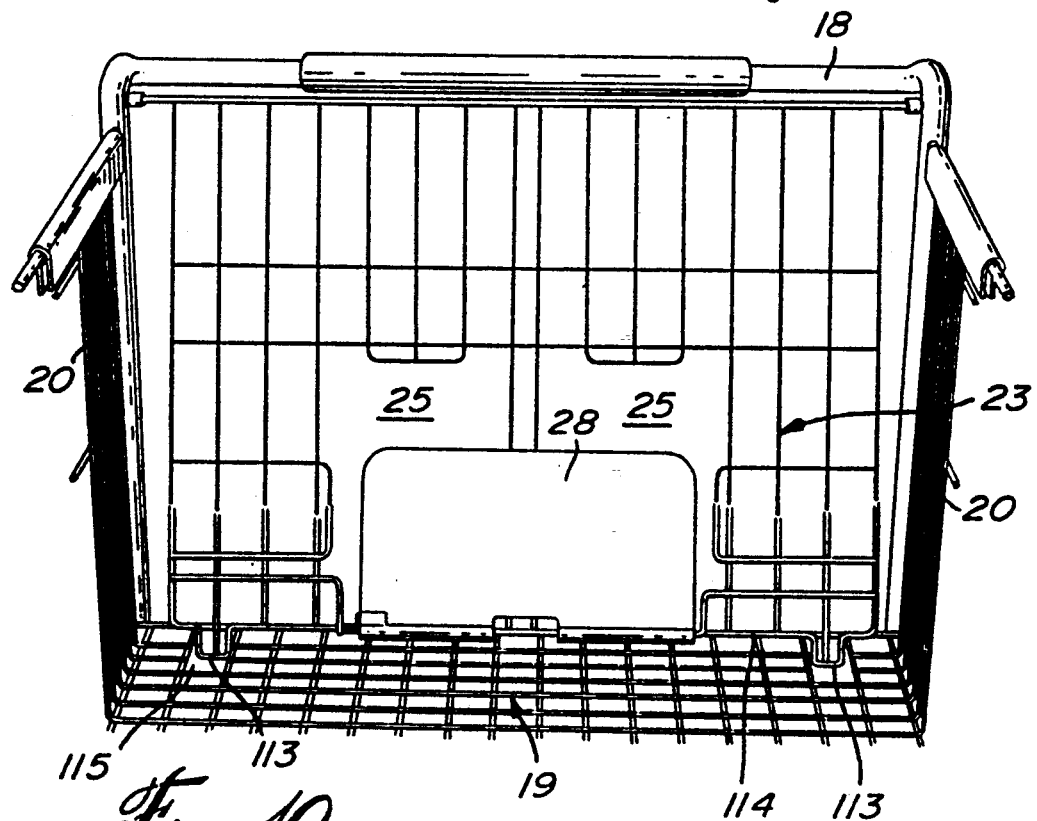

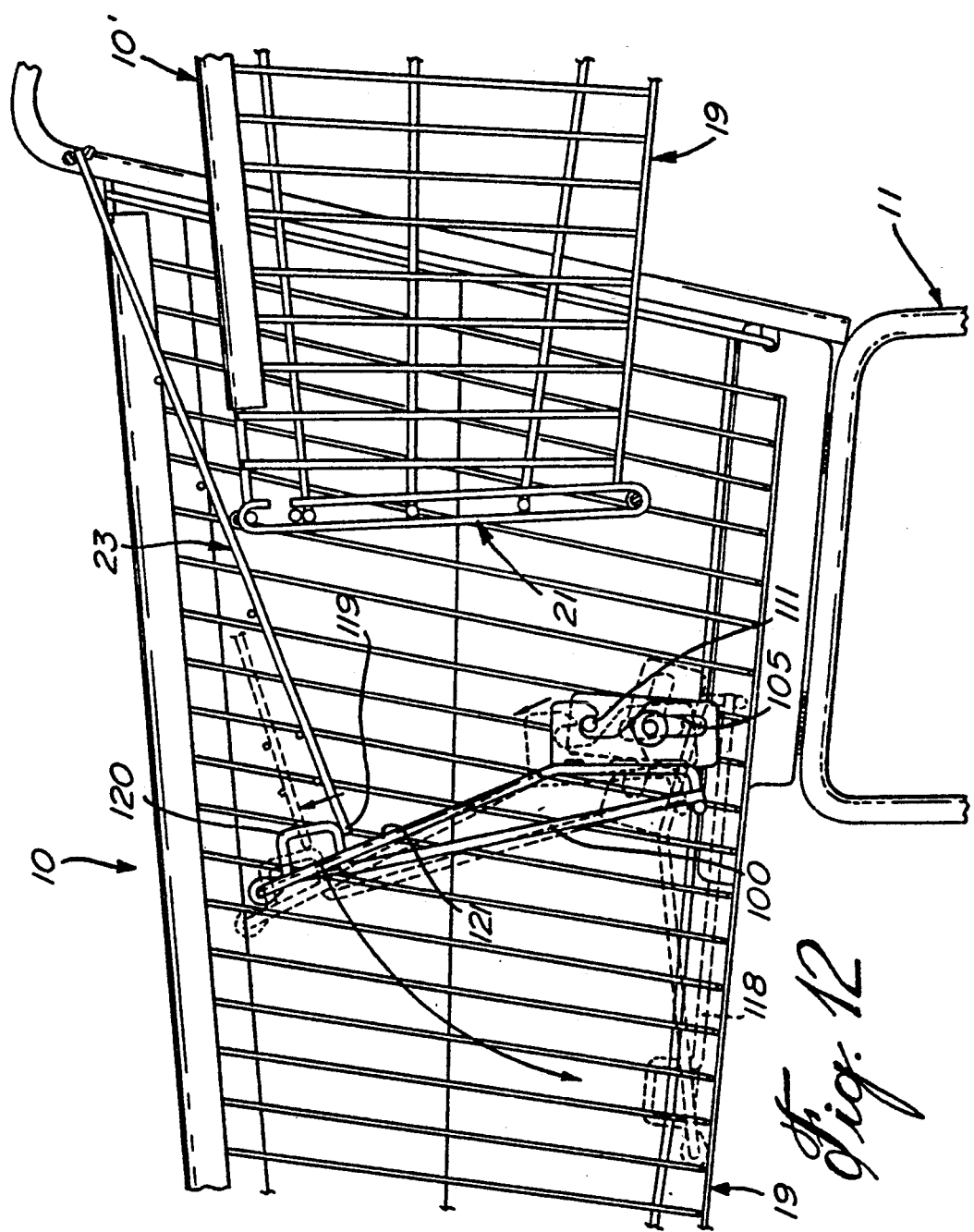

END-TO-END NESTABLE OVER-THE-COUNTER DISCHARGE SHOPPING CART

This is a continuation-in-part application of U.S. patent application 07/971,236 filed Nov. 4, 1992 now abandoned and entitled "END-TO-END NESTABLE OVER-THE-COUNTER DISCHARGE SHOPPING CART".

TECHNICAL FIELD

The present invention relates to an end-to-end nestable shopping cart and wherein the backrest of the babyseat compartment is caused to collapse on the bottom wall of the open-ended basket of the shopping cart by the nesting of another cart which pushes the back gate to swing inwardly and engage the backrest to disengage it from an upright position and cause it to fall onto the bottom wall of the basket. Preferably, but not exclusively, the shopping cart of the present invention is of the over-the-counter discharge type.

BACKGROUND ART

Currently, over-the-counter discharge shopping carts have been constructed with a portion of the shopping basket being hingeable vertically on its support frame so as to store the shopping carts nested closer to one another as they could not be nested end to end. U.S. Pat. Nos. 4,423,882 and 3,815,932 are examples of such shopping cart design. A disadvantage of such hinged baskets is that in most instances the person using the shopping cart does not take the time to hinge the baskets vertically when returning the cart to the nesting bay. When the basket is not hinged upwardly, the carts take a lot of space in the storage bay. Consequently, the carts are strewn in various areas of department stores, grocery stores, etc. There are many disadvantages arising from this problem. Also, many users do not know how to store the carts, and the fact that the basket is hinged upwardly can be hazardous, particularly to children who have a tendency to play with shopping carts. The fact that the basket is hinged to the frame also necessitates the construction of a separate babyseat compartment in the back portion of the hinged basket. This is more expensive to fabricate. Still further, the fact that the basket is secured to hinges makes it susceptible to more frequent damage thereby necessitating more repair.

In an attempt to resolve the above disadvantages of hinged basket, a nestable shopping cart for over-the-counter discharge was designed as exemplified by U.S. Pat. No. 3,645,554 issued Feb. 29, 1972. However, because of the problem of maintaining the handlebar at a convenient level, due to the proposed design, it was necessary to have the handle assembly pivot to lift up during nesting of carts. Further, in order to provide a babyseat compartment, a complex design evolved wherein the rear gate is hingedly connected to a seating frame which itself is also hingedly connected to a backrest. When a cart is nested through the rear gate, the seating frame and backrest folded on one another and onto the rear gate and upwardly on top of the nesting cart. At the same time the handlebar pivoted upwardly to permit entry of the nesting cart through the rear gate. The complexity of this arrangement provides for various malfunctions and break-down making the carts inoperative, and the construction and repair of such is expensive.

SUMMARY OF INVENTION

It is a feature of the present invention to provide an end-to-end nestable shopping cart, and preferably but not exclusively, of the over-the-counter discharge type, and which substantially overcomes the above-mentioned disadvantages of the prior art.

A further feature of the present invention is to provide an end-to-end nestable shopping cart of the over-the-counter discharge type, and having a single basket with an integral babyseat compartment and wherein the shopping carts are nestable end to end with the babyseat backrest being automatically displaced to a collapsed position on the basket bottom wall by the nesting of the carts.

Another feature of the present invention is to provide an end-to-end nestable shopping cart wherein the babyseat backrest is hinged below the bottom wall of the shopping basket and caused to be displaced from an upright position of use to a collapsed storage position by displacing the rear gate on a hinge connection upwards and forwardly by the introduction of a nesting shopping cart.

Another feature of the present invention is to provide an improved end-to-end nestable over-the-counter discharge shopping cart having a fixed handlebar design which permits nesting from the rear gate.

Another feature of the present invention is to provide an end-to-end nestable shopping cart of the over-the-counter discharge type and wherein the hinged front wall of the basket is provided with a novel securement means.

According to the above features, from a broad aspect, the present invention provides an end-to-end nestable shopping cart having a frame supported on casters with a basket having an open top end supported elevated by the frame. The basket has a bottom wall, opposed side walls tapered inwardly from a rear end to a front end, a front wall, and a rear gate hinged along a top edge thereof and having leg holes therein. A handlebar is disposed rearwardly of the rear gate to displace the shopping cart on casters. A babyseat compartment is defined in the basket between the rear gate and a hinge backrest disposed in the basket and spaced from the rear gate. The backrest also has a lower hinge connection. Arresting means is provided to maintain the backrest upright above the bottom wall. The rear gate has engagement means to engage and displace the backrest, when in an upright position, to a forward collapsed position over the bottom wall when another cart is nested through the rear gate causing the rear gate to be displaced inwardly to engage the backrest.

According to another broad aspect of the present invention, there is provided a novel hinged front wall for the basket. The front wall has opposed hinged pins in the lower edge thereof and extending into a respective vertical guide slot provided at opposed forward lower ends of the side walls. Each of the vertical guide slots extends at least in part above the bottom wall. Front wall retention means is formed on opposed sides of the front gate for releasable engagement in retention slots provided at opposed upper forward ends of the side walls above the bottom wall. The retention slots have a mouth opening for receiving and releasing the front wall retention means.

BRIEF DESCRIPTION OF DRAWINGS

A preferred embodiment of the present invention will now be described with reference to the accompanying drawings, in which:

FIG. 9 is a fragmented perspective view showing the construction of the connecting flange secured in opposed lower corners of the backrest frame, and engageable with a stationary bracket secured to the side walls of the basket;

FIG. 10 is a view of the rear gate as seen from the inside of the basket of the shopping cart;

FIG. 12 is a view similar to FIG. 11, but showing the action of the rear gate on the backrest frame to disengage the frame;

DESCRIPTION OF PREFERRED EMBODIMENTS

Figure 1:
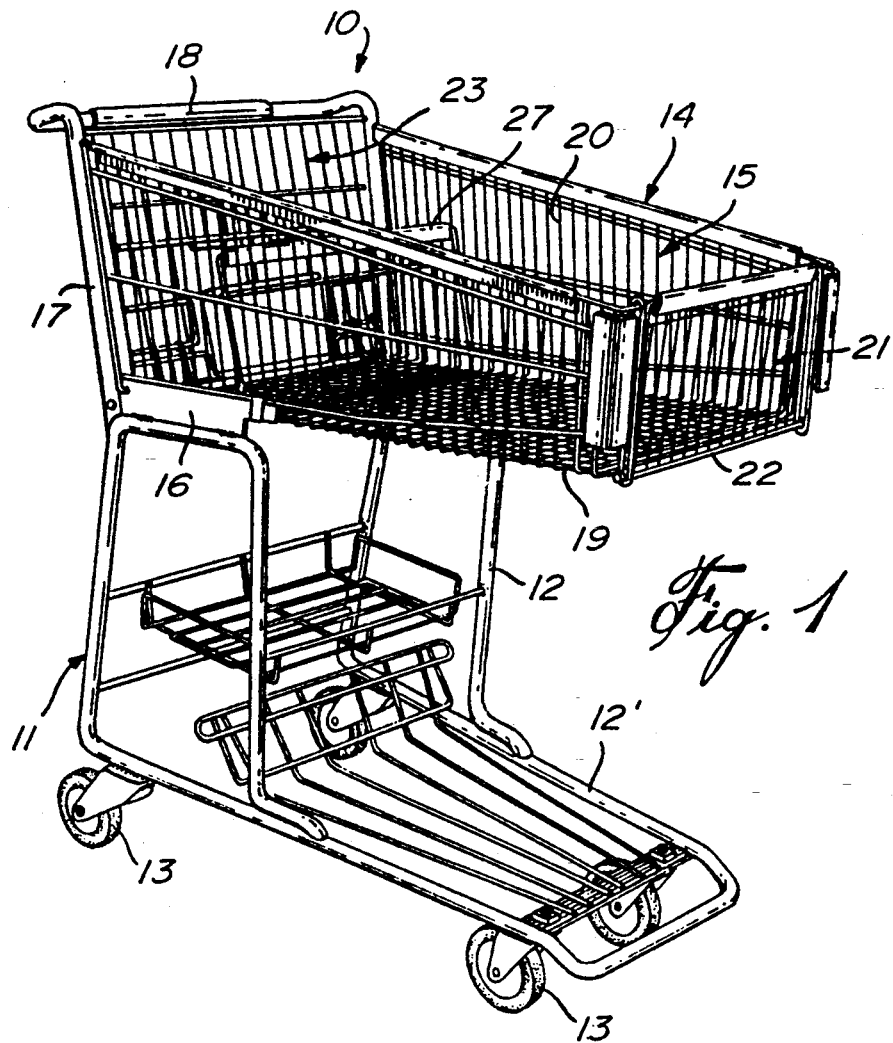
FIG. 1 is a perspective view of the end-to-end nestable shopping cart of the present invention.
Figure 2:
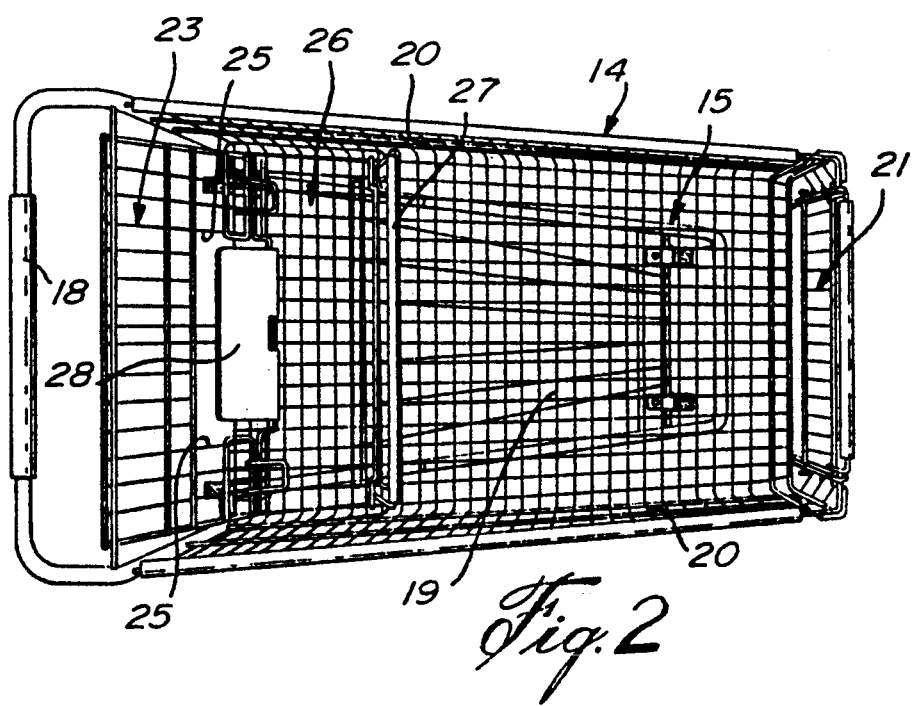
FIG. 2 is a top view of the shopping cart of FIG. 1.

Referring to the drawings, and more particularly to FIGS. 1 and 2, there is shown generally at 10 an end-to-end nestable shopping cart of the present invention and of the type for over-the-counter discharge. The cart has a frame 11 which is constructed of metal tubular members 12, as is well known in the art, and secured for displacement on casters 13. The frame lower end member 12' are angled to nest. A basket 14 having an open top end 15 is secured elevated by the top tubular members 12' of the frame 11 which is also provided with a reinforcement plate 16 secured between the horizontal top tubes 12' and the basket. Opposed vertical tubes 17 are secured along the rear vertical edge of the basket and constituted by a single inverted U-shape tube bent at the top to define a handlebar 18 to displace the shopping cart on the casters.

The basket 14 has a bottom wall 19 and opposed side walls 20 which taper slightly inwardly from a rear to a front end to permit the nesting thereof. A front wall 21 is hingedly secured at a bottom pivot end 22 thereof to the front of the basket to hinge the front wall to permit access to the inside of the basket 14 for the removal of foodstuff, etc. A rear gate 23 is hinged along a top edge 24 thereof and is provided with leg holes 25 for a child sitting in a rear babyseat compartment, as is well known in the art.

The babyseat compartment 26 is defined in the basket 14 between the rear gate 23 and a hinged backrest 27. A seating plate 28 is hingedly connected on the bottom wall 19 for an infant to sit on with the infant's legs extending through the leg holes 25 and his back resting on the backrest 27. If desirable, when the babyseat compartment 26 is not in use, ht hinged backrest 27 may be hinged to a collapsed position over the bottom wall 19, as will be described later.

Figure 3:
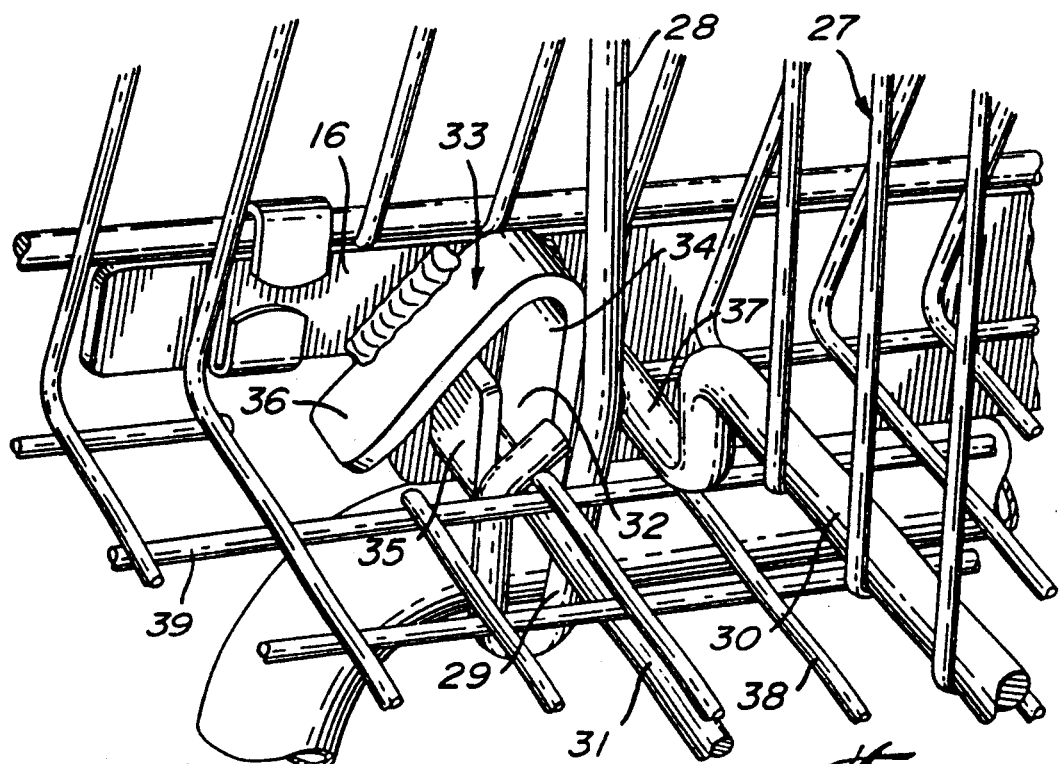
FIG. 3 is a perspective view showing the construction of the babyseat backrest and its securement within the basket.

Referring now additionally to FIGS. 3 to 8, there will be described the construction and operation of the babyseat backrest 27. As shown in FIG. 3, the backrest, like the shopping basket 14 and the rear gate 23, is constructed of welded wire rods, and the backrest is a substantially rectangular wire frame having opposed vertical end rods 28 defining hinged connections, in the form of loop ends 29, at a lower end thereof and disposed spaced below the lower horizontal transverse rod 30 of the rectangular frame. These loop ends or hinge connecting loops 29 are secured about an elongated pivot rod 31 extending at opposed ends thereof into transversely aligned vertical retention slots 32 formed in stationary hinged brackets 33 secured adjacent a respective side wall 20 of the shopping cart basket. The hinged brackets 33 are constituted by a rectangular elongated metal strip which is shaped to form a bottom U-shape vertical slot 32 which is defined between an elongated wall section 34 and a forward lip section 35. The elongated wall section 34 extends above the lip section and the basket bottom wall end is folded over to define a sloping guide wall 36 for the backrest and extends forwardly of the U-shape slot section and thereabove. The hinge bracket 33 is secured on a respective side of the basket with the U-shape slot section 32 disposed below the basket bottom wall 19 and extending substantially transverse thereto. The sloping guide wall 36 extends above the bottom wall 19 and slopes therein.

As can be seen in FIG. 3, the babyseat backrest 27 is provided with an outwardly extending side shoulder element, herein a rod end 37, positioned at a predetermined location in a lower side region of the backrest and protruding from opposed vertical side end rods 28 thereof. This rod end 37 is disposed for arresting abutment against the rear wall section 34 of the hinged bracket 33 to prevent the backrest from forward displacement when in its upright position of use, as shown in FIG. 3. The backrest is prevented from being displaced rearwardly by a retention element, herein constituted by the adjacent transverse rod 38 forming part of the bottom wall 19 of the basket and disposed closely spaced behind the rear wall section 34 of the bracket 33. this transverse rod 38 is abutted by the vertical end rods 28 of the backrest 27. The rod ends 27 are also slidable over the sloping guide wall 36 when the backrest 27 is pulled rearwardly to its upright position or when it is lifted and dropped forwardly. The sloping guide wall 36 extends within the plane of the bottom wall 19 and guides the backrest to a forward fall.

Figure 4:
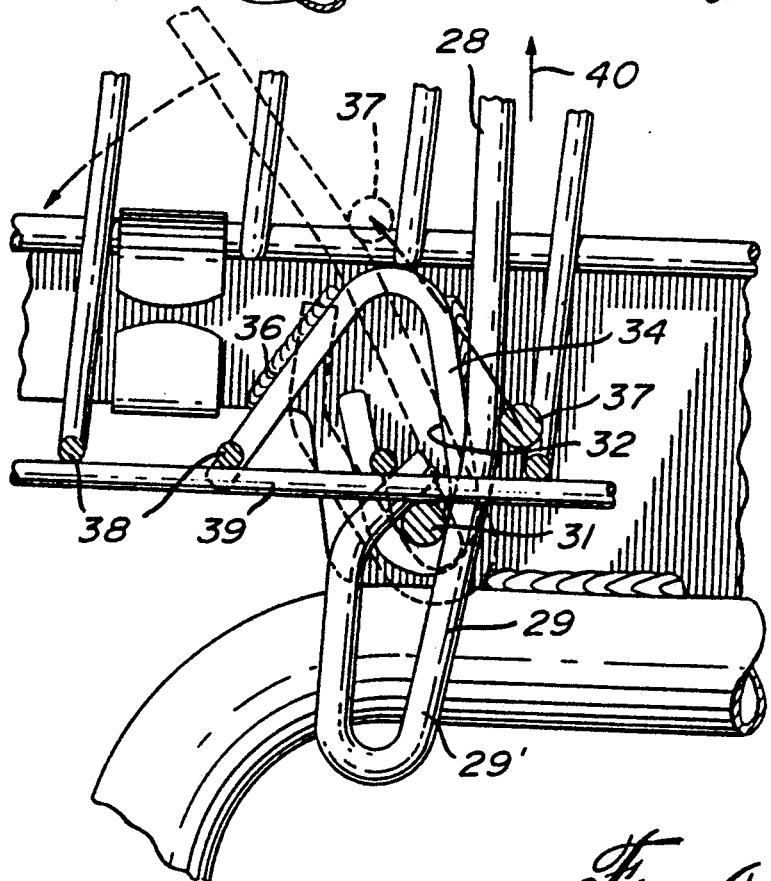
FIG. 4 is a side view illustrating the manner in which the backrest is held in an upright position of use.
Figure 5:
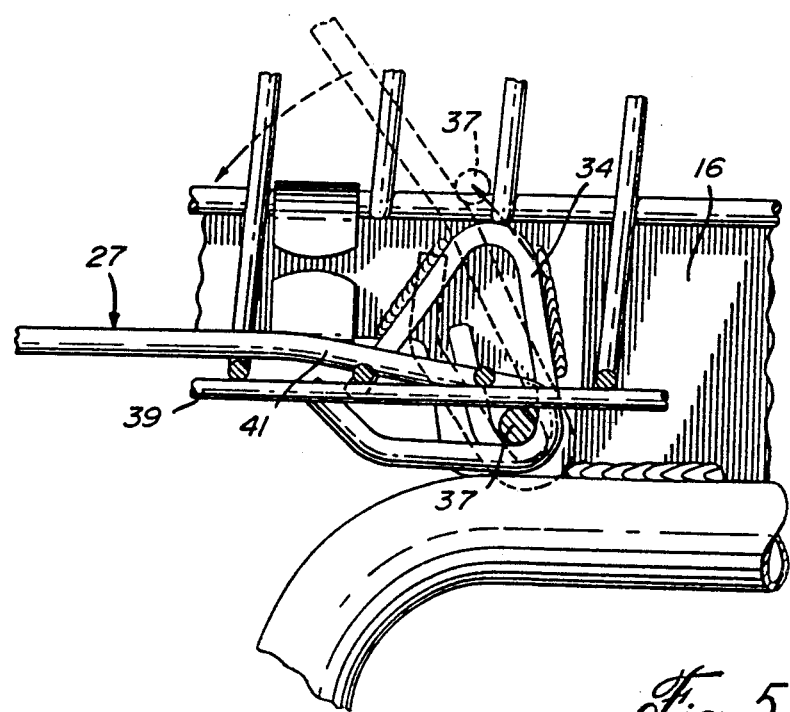
FIG. 5 is a side view similar to FIG. 4, but showing the backrest in its forward collapsed stored position.

Referring now additionally to FIGS. 4 and 5, it can be seen that the rod ends 37 rests on the elongated transverse rods 39 of the basket when the babyseat backrest is upright, as shown in FIG. 4. When in this position of use, it can be seen that the loose pivot rod 31 sits at the bottom of the elongated slot 32 of the bracket and the elongated hinged connected loop 29 has the pivot rod 31 in an uppermost portion thereof. To disengage and collapse the babyseat backrest 27 from the upright position, it is necessary to lift the backrest in the direction of arrow 40 until the rod ends 37 are above the sloping guide wall 36 of the bracket, and to let it fall forwardly thereover. The end rods 28 have a slight bend 41 in a lower region thereof so that the babyseat backrest lies substantially on or closely spaced to the bottom wall 27, as shown in FIG. 5, when in its collapsed position. It is also pointed out that the elevated wall section 34 of the bracket 33 extends above the elongated rods 39, forming the basket bottom wall, a distance greater than the length of the loop 29' defined by the loop ends 29. Accordingly, when the babyseat backrest 37 is pulled upwardly, the loop 29 moves up to engage the pivot rod 31 and then displaces the pivot rod upwardly within the vertical slot 32 towards the elongated rods 39 forming the bottom wall. The pivot for the babyseat backrest is therefore below the bottom wall. However, it is conceivable that the pivot could be secured within or even above the basket bottom wall, and this modification would be obvious to a person skilled in the art.

Figure 6:
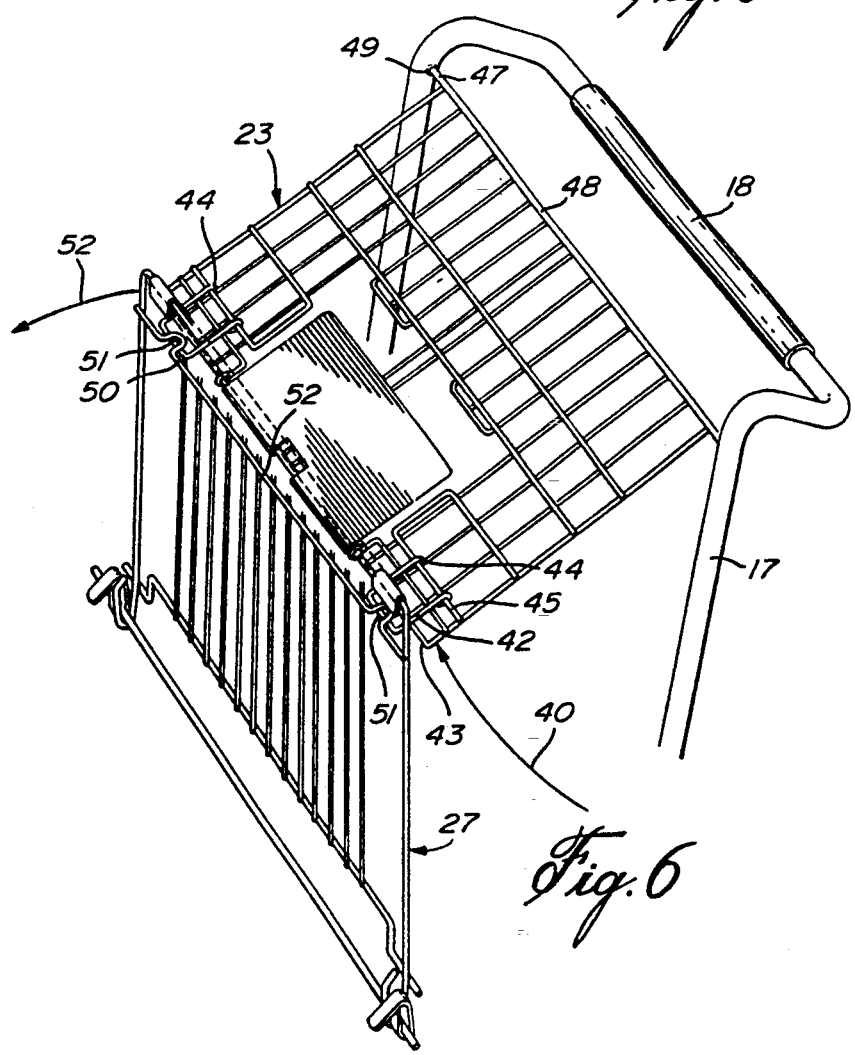
FIG. 6 is a section view illustrating the construction of operation of the rear gate.
Figure 7:
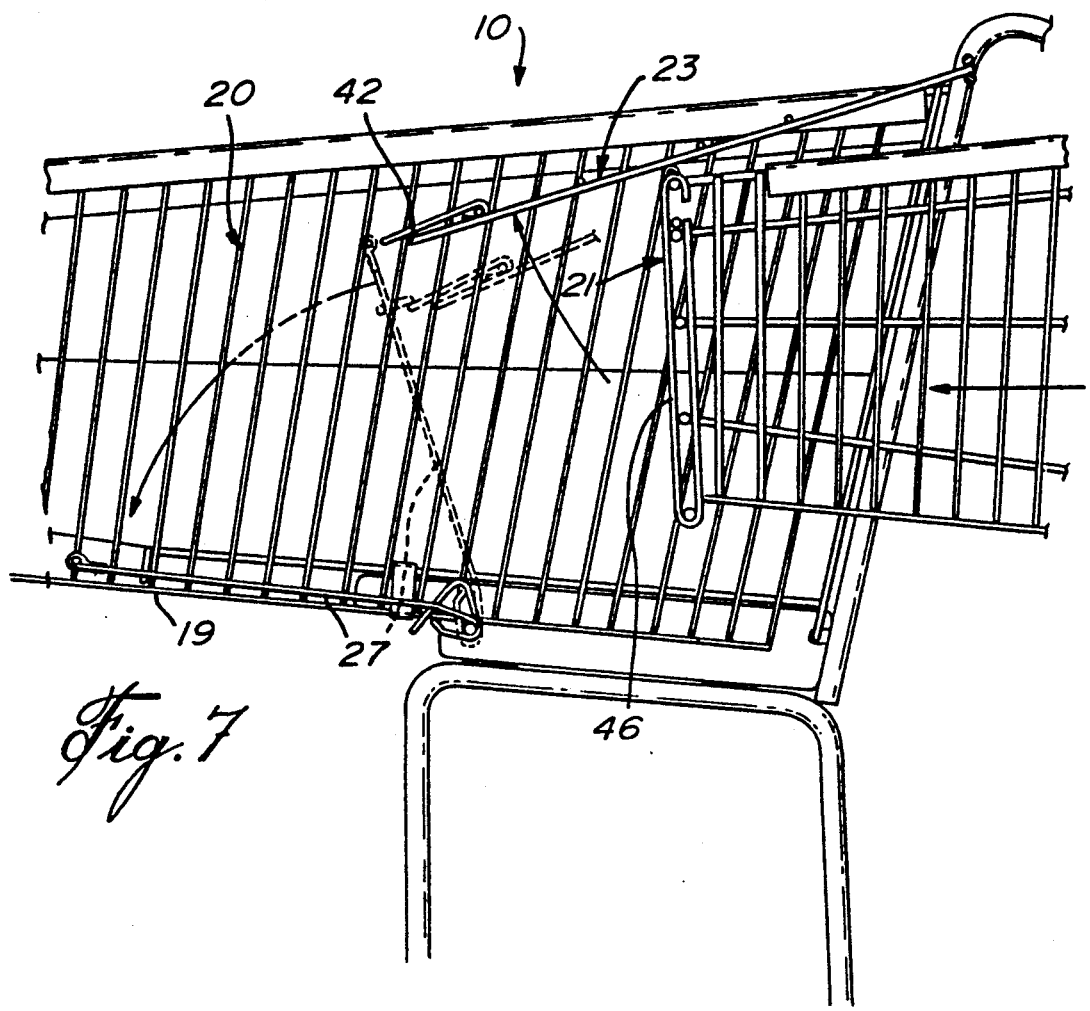
FIG. 7 is a fragment side view showing the nesting of shopping carts and the operation of the rear gate and the babyseat backrest.
Figure 8:
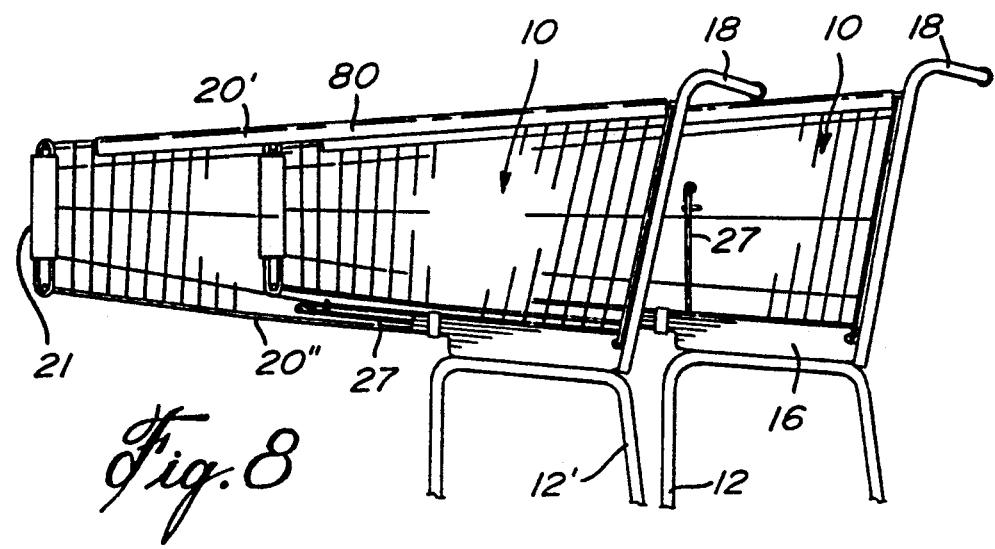
FIG. 8 shows two shopping carts of the present invention fully nested end to end.
Figure 13:
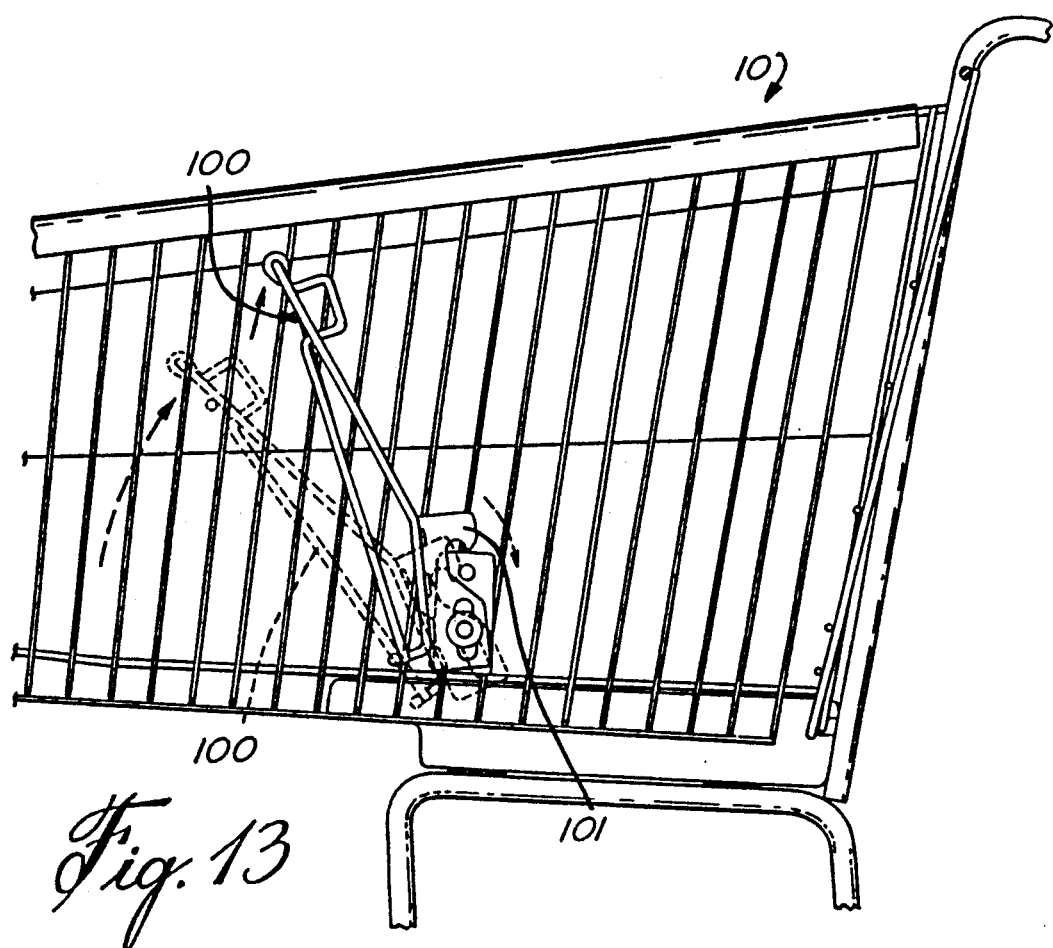
FIG. 13 is a fragmented side view of the shopping cart showing the backrest frame being hinged from a collapsed position to a position of use.

A novel feature of the present invention is the manner in which the babyseat backrest 27 is automatically disengaged from its upright position when a shopping cart is nested within its basket from the hinged rear gate, as illustrated in FIGS. 7 and 8. With further reference now to FIGS. 6 to 8, there will be described the manner in which the babyseat backrest is automatically disengaged from its upright position and displaced to its collapsed storage or non-use position.

As shown more clearly in FIG. 6, the rear gate 23 is provided with a gate engagement means comprised of a pair of lifting tabs 42 disposed spaced apart and extending beyond a bottom edge 43 of the gate 23 in opposed end regions thereof. These tabs are formed by short U-shape wire members having opposed loop ends 44 hingedly secured to a transverse rod member 45 in the rear gate 23. When the rear gate 23 is in its closed position, the lifting tabs can hinge outwardly when abutting the wire rods of the basket bottom wall. As shown in FIG. 7, when the forward end 46 of a nesting shopping cart 10' is pushed through the rear gate 23 to next with the shopping cart 10, it causes the rear gate 23 to move upwardly on its top hinge connection which is constituted by the free ends 47 of the top rod 48 thereof being received in pivoting holes 49 provided in the top part of opposed elevated vertical tubular frame members 17. With the babyseat backrest 27 in its upright position, as shown in FIG. 6, these lifting tabs 42 will engage with a top side end member of the backrest which may be a portion of the top rod 50 that is unobstructed or, as herein shown, by a tongue 51 which is formed by a U-shape bend in a transverse wire rod 52 disposed adjacent the top of the bracket and provided on opposed sides of the backrest. These tongues 51 face inwardly towards the rear gate and are aligned with a respective one of the lifting tabs 42. By further upward movement of the hinged rear gate 23 the backrest is caused to move upwardly in the direction of arrows 40 by the tabs pushing against the tongues, until the front wall 21 of the nesting shopping cart 10' pushes the backrest forwardly so that the rod ends 37 slide on the sloping guide wall 36 to cause the gate to pivot forwardly to fall on the bottom wall 19 of the basket, in the direction of arrow 52, as shown in FIG. 6.

It can be seen that with the present invention it is possible to nest over-the-counter discharge shopping carts end to end as is customary with conventional carts. Therefore, with the nestable shopping cart of the present invention it is no longer necessary to form the shopping cart basket with a separate babyseat compartment and to hingedly mount the front basket section to hinge about the babyseat compartment. The backrest is automatically positioned to a collapsed position by the nesting.

Referring now to FIGS. 9 to 13, there is shown a modification of the hinge connection and arresting means of the rear gate or backrest frame 100. As herein shown, a connecting flange 101 is secured in opposed lower corners of the backrest frame 100, herein secured to the outside rods 102 by welds 103, and engageable with a stationary bracket 104 which is secured to a respective one of the side walls 20 of the basket 14 adjacent the bottom wall 19 thereof.

The connecting flange 101 is a vertical rectangular steel flange having an elongated vertical through-slot 105 in a lower section thereof. A pivot pin 106 is secured to the stationary bracket 104, and extends through the vertical through-slot 105. A washer or other form of end wall 107 is secured to the end of the pivot pins 106. It is pointed out that the hinge connection at the other corner of the backrest frame 100 is identical in construction, and only one will be described herein.

Figure 11:
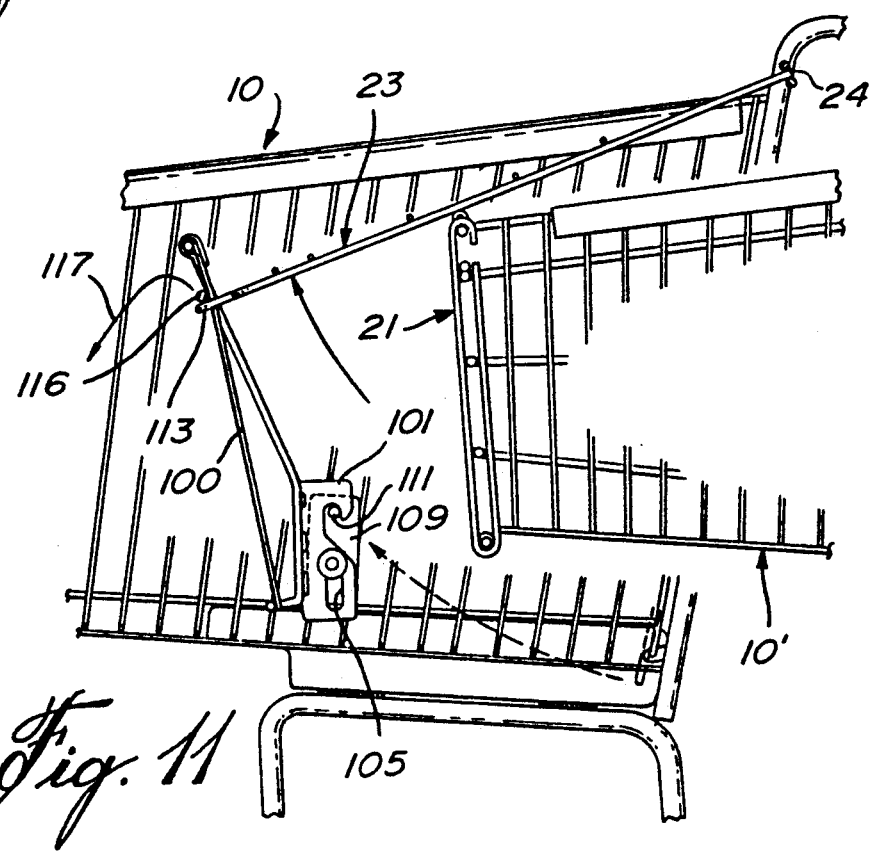
FIG. 11 is a fragmented side view showing two shopping carts being nested.

The connecting flange also is provided with an arresting means in the form of a retention channel 108, and has a mouth opening 109 in a rear edge 110 of the connecting flange 101 to provide access to the retention channel 108 formed integrally therewith. A retention pin 111 is secured to the stationary bracket 104 and extends inwardly of the basket of the shopping cart. The through-slot 105 permits the backrest frame 100 to be secured in a substantially upright position, as shown in FIGS. 9 and 11, by causing the retention pin to enter the retention channel 108, or be disconnected to a collapsed position, as shown in phantom lines in FIG. 12, by causing the retention pin to exit the retention channel bent out of the mouth opening.

As is clearly shown in FIG. 9, the mouth opening 109 is provided with an upwardly slanted lower edge 112 and extends from below the retention pin when the pivot pin is in a lower end of the through-slot 105 with the backrest frame lifted about the pivot pins to guide the retention groove over the retention pin to engage with the retention pin when the gate is released thereover.

As shown in FIG. 10, the rear gate 23 is herein provided with engagement means in the form of one or more lower edge engaging tabs 113, herein two being shown, protruding from a straight lower edge 114 of the rear gate 23. Small cavities 115 are provided in the bottom wall 19 of the basket to permit passage of these tabs 113. As more clearly shown in FIGS. 11 and 12, when the rear gate 23 is hinged on its hinge top end 24 by entry of a nesting cart 10' through the rear gate 23, the tabs 113 engage with a transverse rod 116 of the backrest frame 100 to lift the frame upwardly causing the retention pin 111 to be liberated from the retention cannel 108, and positioning same in the area of the mouth opening 109. Because the backrest frame 100 is sloped forwardly, it will then fall by gravity in the direction of arrow 117 and fall on the bottom wall 19 of the basket, as shown in phantom lines at 118 in FIG. 12.

As also shown in FIG. 12, the rear gate engagement means is provided simply by a straight lower edge 119 of the rear gate 23 to engage with one or more abutment members 120 extending from an inner surface 121 of the backrest frame 100 to lift the backrest frame to disengage same from the retention pin 111 in a manner as above described. The through-slot 105 provides a floating hinge connection for the backrest frame to permit the backrest frame to move up and down about the hinge pin and forwardly to a collapsed position on the bottom wall of the shopping cart. Once the backrest is in a collapsed position, it is only necessary to lift the backrest with the hand, and, by pushing it back to its upright position of use while pulling upwardly on the gate, the retention pin 111 will enter the mouth opening 109 and the gate can then be released in engagement.

Figure 14:
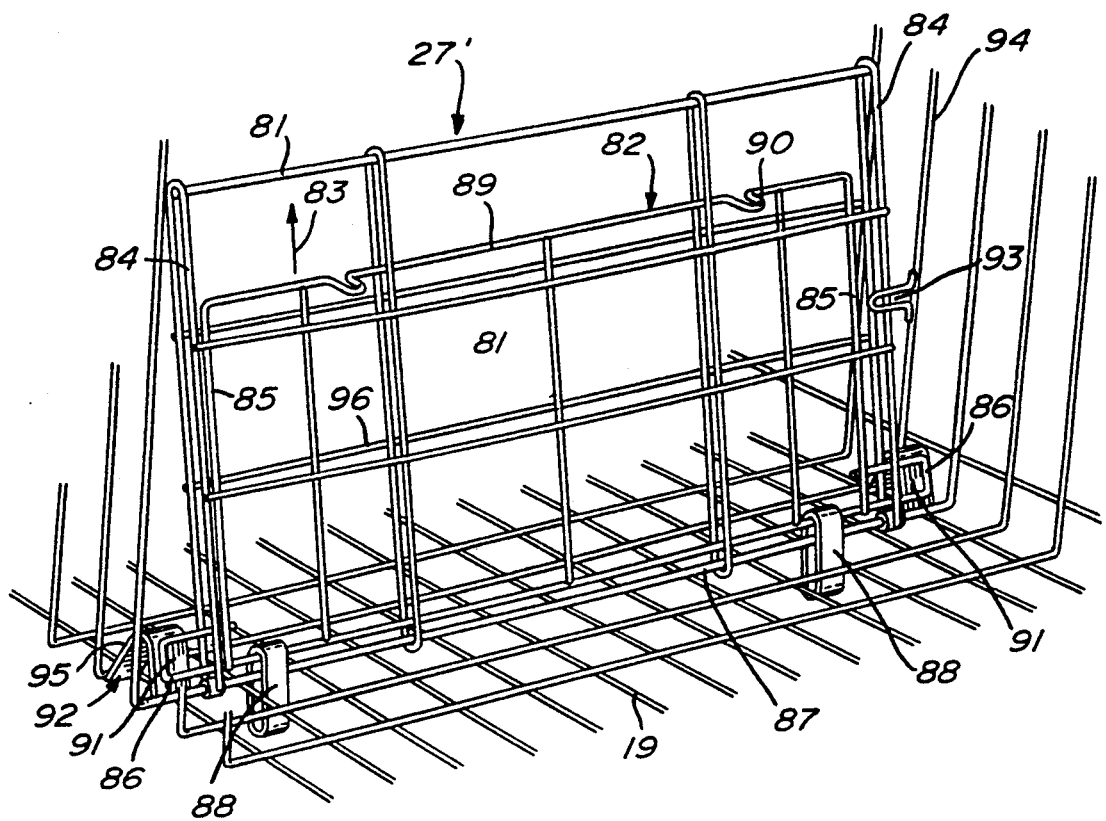
FIG. 14 is a perspective view of a modified babyseat backrest illustrating possible modifications of the preferred embodiment while retaining the essential characteristic of disengaging the backrest by the inward displacement of the rear gate.

Referring now to FIG. 14, there is shown a further embodiment which illustrates that various modifications can be made to the babyseat backrest 27 of the present invention while retaining the novel feature of disengaging the backrest by displacing the rear gate inwardly when introducing a nesting cart through the rear gate. As shown in FIG. 14, the backrest 27' is formed from wire rods 81 and is provided with a vertically displaceable member or inner frame 82 secured therein. The displaceable member 82 is guidingly displaceable in the vertical direction as shown by arrows 83 while retained captive within the backrest frame 84. The displaceable member 82 is herein constituted by a wire rod frame of generally inverted U-shape configuration and having opposed vertical rod sections 85 and having at the bottom free end thereof a shoulder element 86 welded thereto. The shoulder element can also be formed by bending the bottom portion of the vertical rod section 85 to form a U-shape extension which is disposed outwardly from the respective vertical rod sections 85.

The backrest 27' has a bottom pivot rod 87 which is hingedly secured to the basket bottom wall 19 by hinge clamps 88. The top wire rod 89 of the displaceable member 82 is provided with engagement means of the type shown in FIG. 6, and namely tongue members 90 formed within the top wire rod 89. When the rear gate 23 is hinged inwardly, as previously described, by a nesting cart, the lifting tabs 42 engage with the tongue members 90 and displace the displaceable member 82 upwardly in the direction of arrow 83. This causes the shoulder elements 86 to be displaced out of engagement with the arresting means which is herein constituted by the back wall 91 of the bracket 92. The arresting means also comprises the abutment formation 93 extending inwardly of the basket side walls and formed with one of the vertical wire rods 94 forming the side walls 20. This abutment formation 93 prevents the backrest frame 84 from rearward displacement. The bracket 92 is also provided with a sloped forward wall 95 to guide the shoulder element 86 thereover to assist in the backrest falling forwardly when the shoulder element is dropped on the sloped wall 95.

In order to raise the backrest to its upright position, it is necessary to grasp the top wire rod 89 and to pull it upwardly towards the top rod 81 of the backrest frame 84, and to move the backrest to its vertical position, at which location the top wire rod 89 of the displaceable frame is released to cause the shoulder elements to rest behind the bracket 92. The displaceable member 82 or wire frame is held within the backrest frame 84 between an arrangement of wire rods, such as opposed pairs of parallel rods 96. It becomes obvious from the construction of FIG. 14 that various other modifications of the construction of the backrest are possible without departing from the main characteristics of the invention, which is the automatic displacement of the backrest by the rear gate with the backrest not being secured to the rear gate.

Figure 15:
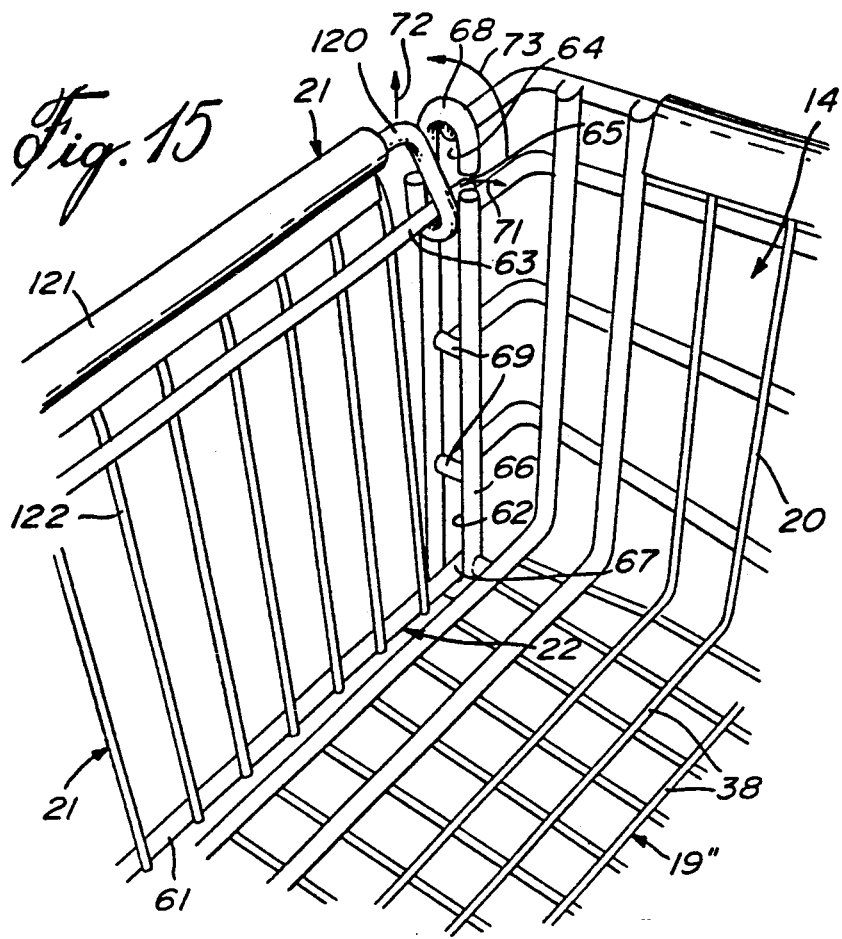
FIG. 15 is a perspective view showing the construction of the hinged front wall of the shopping cart with the front wall in an engaged position.
Figure 16:
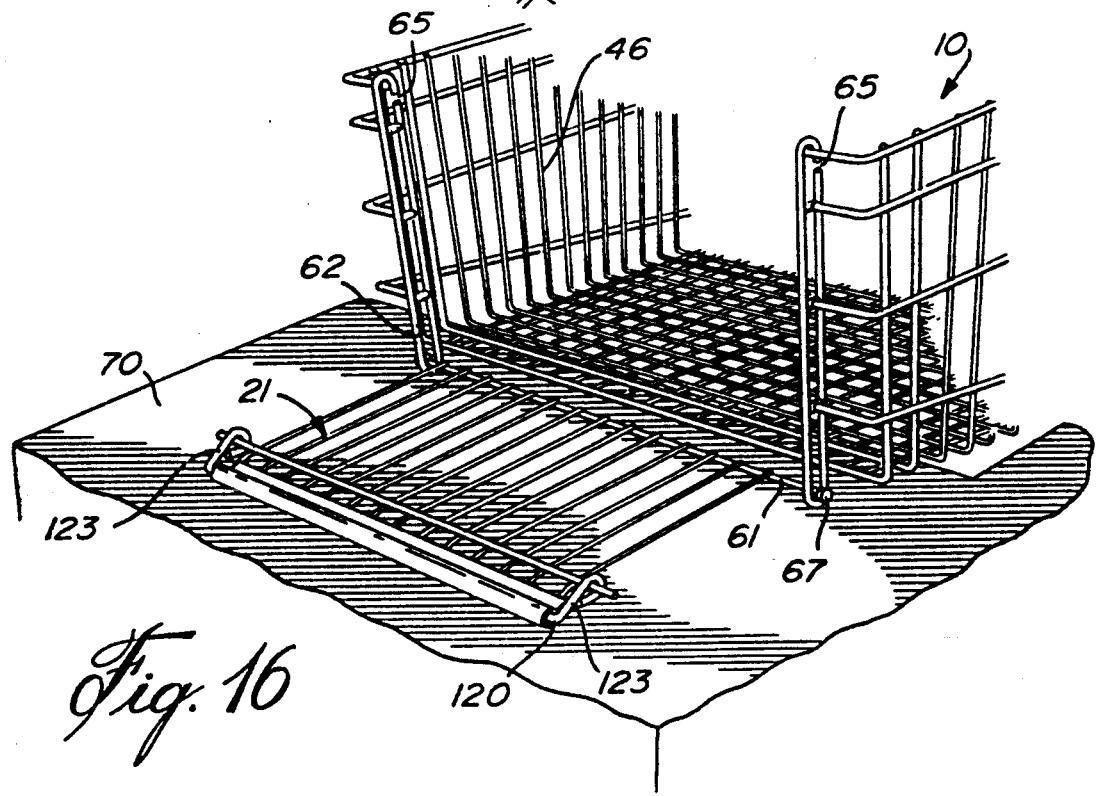
FIG. 16 is a perspective view showing the hinged front wall in its disengaged position for discharging foodstuff from the basket over a counter.
Figure 17:
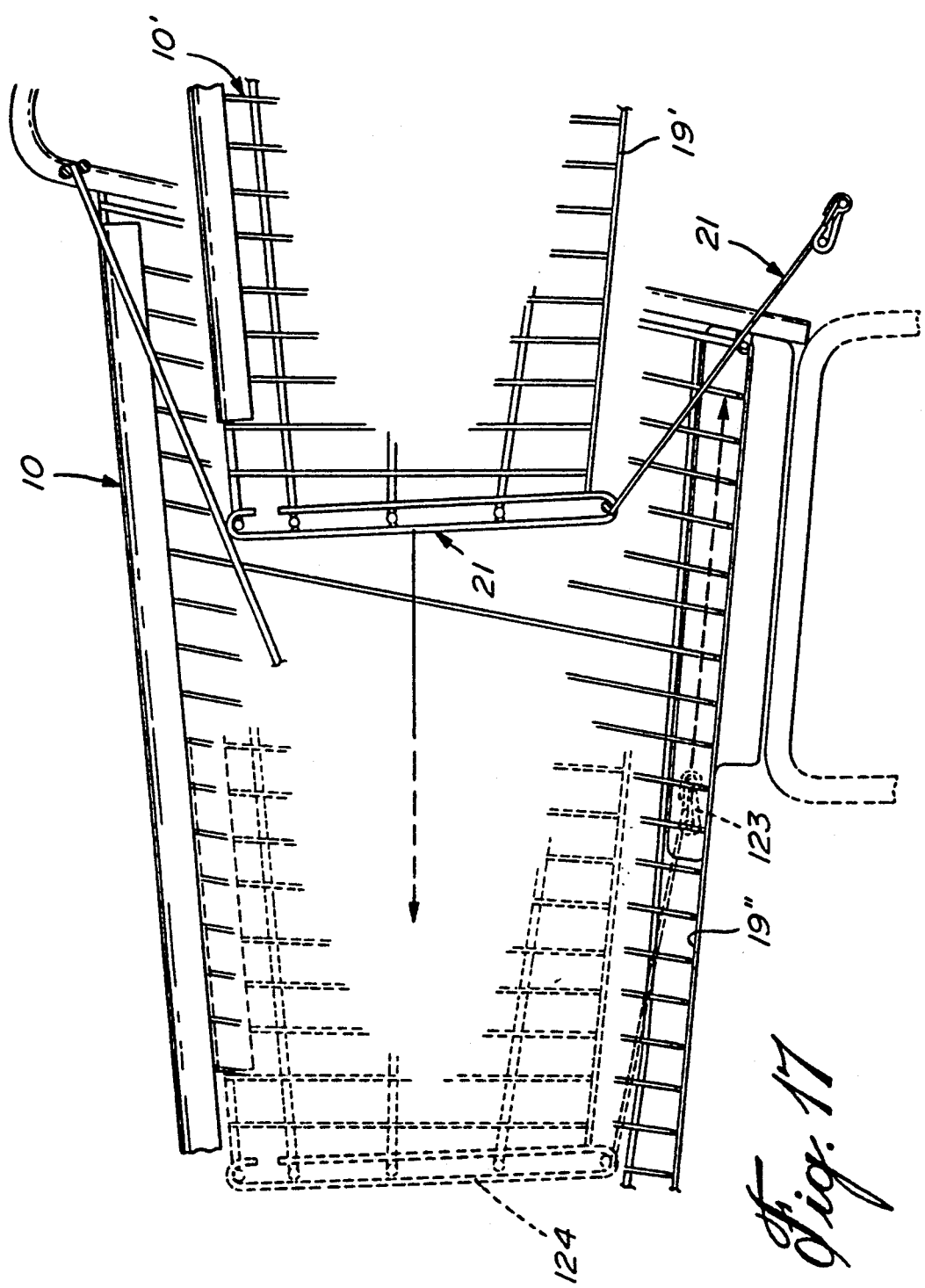
FIG. 17 is a side view of two over-the-counter shopping carts being nested end to end showing the nestable feature of the front discharge wall when in a non-engaged depending position.

Referring now to FIGS. 15 to 17, there is shown the construction of the hinged front wall 21 of the basket 14. As herein shown the front wall 21 is provided with opposed hinge pins 60 constituted by the ends of the lower rod 61 forming the front wall 21, and these hinge pins 60 extend into a respective one of vertical slots 62 provided at opposed forward lower ends of the side walls 20. Each of the vertical guide slots 62 extends at least iin part above the bottom wall 19. Front wall retention means is formed on opposed sides of the front gate and is constituted by transverse wire rod ends 63 extending beyond the vertical edges of the hinged front wall 21 for releasable engagement in a respective one of retention slots 64 provided at opposed top ends of the side walls above the bottom wall. The retention slots 64 have a mouth opening 65 for receiving and releasing the front wall rod ends 63. As herein shown these guide slots and retention slots are defined between a pair of vertically extending attachment members which are constituted by a wire member which is bent to provide elongated parallel wire sections 66 are bent at a lower end 67 and a top end 68. Short transverse rods 69 solidifies the wire section 66 and delimits the length of the vertical guide slot 62 and the retention slot 64. The vertical guide slot 62 extends below the level of the basket bottom wall 19, although it may be terminated within the plane of the bottom wall. The vertical guide slots 62 are also longer than the distance between the mouth opening 25 of the slot 64 and the top turned end 68 to displace the wire rod end 63 over the top turned end 68 to disengage the front wall.

As shown in FIG. 16, when in use the over-the-counter shopping cart is displaced with the forward end 46 of the cart positioned over a countertop 70, and the hinged front wall is disengaged by moving it upwardly and pushing it inwardly until the rod ends extend out through the mouth opening in the direction of arrow 71. The gate is then moved upwardly in the direction of arrow 72 and forwardly over the top end 68 iin the direction of 73. The gate can then rest on the countertop 70 and goods from within the shopping cart compartment may be discharged forwardly over the counter. An important safety feature of the hinged gate of the shopping basket is the fact that the mouth opening of the retention slot 64 is positioned inwardly of the basket making it extremely difficult to be operated by a child. Also, the mouth opening is spaced from the bottom and top ends of the retention slots so that the front wall is always maintained engaged by gravity, that is to say, by the weight of the front wall. If the gate is lifted entirely upward, it will not be disengaged by a child, as there would be obstruction. Normally, a child would have a tendency to pull the gate forward to open same, whereas with the present invention it is necessary to push it backwards through the mouth opening after the gate has been lifted a predetermined distance.

As shown in the drawings, the top wire rod 120 of the front discharge wall 21 may be provided with a smoothly rounded plastic protective sleeve 121 to conceal the ends of the vertical rods 122 in the front wall and to facilitate nesting, as shown in FIG. 17. Also, the loop ends 123 of the top rod 120 is inclined rearwardly at a sloping angle so that when the carts are fully nested, as shown at phantom lines 124, the front discharge wall 21 is collapsed under the bottom wall 19' of the nesting basket and over the bottom wall 19" of the front shopping cart basket. In this position, the sloping looping ends 123 are resting on the bottom wall, and when the nested carts are pulled apart its sloped edge together with the protective sleeve 121 will cause the front edge of the front discharge wall 21 to ride smoothly over the transverse rods 38 of the bottom wall 19" to provide ease of nesting and to prevent any form of engagement between the front gate and a nested basket bottom wall.

As previously described, and as shown in FIGS. 1, 2, 7 and 8, the handlebar 18 is formed integral with the opposed vertical tubes 17 along the rear vertical edge of the basket and the reinforcing plate 16. The handlebar 18 is shaped for non-obstruction with a nesting cart, as shown in FIG. 8. As can also be seen from FIG. 8, the top edge 20' of the side walls tapers downwardly with the bottom edge 20" tapering upwardly toward the front wall 21. This provides for a more slender design which permits the handlebar to lie at a comfortable level without the necessity of having to pivot the handlebar, as with the prior art. Also, the top edge 20' of the side wall may be provided with a guard rail 80 to facilitate the slide nesting of the carts and to offer protection.

It is within the ambit of the present invention to cover any other obvious modifications of the preferred examples described herein, provided such modifications fall within the scope of the appended claims.

I claim:

1. An over-the-counter discharge shopping cart having a frame supported on casters, a basket with an open top end supported elevated by said frame, said basket having a bottom wall, opposed side walls, a rear gate and a front discharge wall, and a handlebar disposed rearwardly of said rear gate to displace said shopping cart on said casters, the improvement comprising said basket front discharge wall being a hinged front wall, said front wall having opposed hinge members in a lower edge thereof and extending into a respective vertical guide slot provided at opposed forward lower ends of said side walls, each vertical guide slot extending at least in part above said bottom wall, front wall retention means formed on opposed sides of said front wall in a top end portion thereof for releasable engagement in enclosed top vertical retention slots provided at opposed upper forward end portions of said side walls, each one of said retention slots having opposed top and bottom ends, each said retention slot having a mouth opening formed by spaced terminal end portions of said upper forward end portions, said mouth opening being disposed inwardly of said basket and spaced from said opposed top and bottom ends of said retention slot for receiving and releasing said front wall retention means, said vertical guide slots being longer than the distance between said mouth opening and said top end of said retention slots to permit said gate retention means to be disengaged from said retention slots by passage through said mouth opening in a direction inwardly of said basket and by being raised over said upper forward end portions to permit said hinged front wall to be pivoted forwardly.

2. An over-the-counter discharge shopping cart as claimed in claim 1 wherein said retention means is a rod end of a transverse rod of said front wall.

3. An over-the-counter discharge shopping cart as claimed in claim 2 wherein said opposed hinge pins are constituted by opposed end portions of a straight transverse lower edge rod of said front wall.

4. An over-the-counter discharge shopping cart as claimed in claim 3 wherein said vertical guide slots and said retention slots are defined between elongated parallel wire sections of an elongated vertical wire loop secured adjacent a forward end of said opposed side walls, and transverse rod sections interconnecting said parallel wire section and defining said slots with opposed turned ends of said wire loop.

5. An over-the-counter discharge shopping cart as claimed in claim 4 wherein said vertical guide slots extend below the level of said basket bottom wall.

6. An over-the-counter discharge shopping cart as claimed in claim 5 wherein said gate retention means is an end extension portion of a transverse rod of said front wall disposed adjacent a top edge thereof.

7. An over-the-counter discharge shopping cart as claimed in claim 1 wherein said front discharge wall is provided with smooth frictional support means for engagement with said bottom wall of a nested basket to permit said front discharge wall to be collapsed under said bottom wall of its basket and stored in a collapsed position between its basket bottom wall and said bottom wall of said nested basket when said cart is nested with said front discharge wall disengaged from its position of use as said front wall of said basket.

* * * * *